United States Patent [19]
Townsend et al.

[11] Patent Number: 5,768,378
[45] Date of Patent: Jun. 16, 1998

[54] KEY DISTRIBUTION IN A MULTIPLE ACCESS NETWORK USING QUANTUM CRYPTOGRAPHY

[75] Inventors: Paul D. Townsend, Ipswich; David W. Smith, Campsea Ashe, both of United Kingdom

[73] Assignee: British Telecommunications public limited company, London, England

[21] Appl. No.: 605,048

[22] PCT Filed: Sep. 8, 1994

[86] PCT No.: PCT/GB94/01952

§ 371 Date: Mar. 7, 1996

§ 102(e) Date: Mar. 7, 1996

[87] PCT Pub. No.: WO95/07582

PCT Pub. Date: Mar. 16, 1995

[30] Foreign Application Priority Data

Sep. 9, 1993 [EP] European Pat. Off. .............. 93307120
Sep. 9, 1993 [EP] European Pat. Off. .............. 93307121

[51] Int. Cl.$^6$ ............................................. H04L 9/08
[52] U.S. Cl. .............................. 380/21; 380/112; 380/157
[58] Field of Search .............................. 380/21; 359/112, 359/157, 158

[56] References Cited

U.S. PATENT DOCUMENTS 4,965,856 10/1990 Swanic.
5,191,614 3/1993 LeCong.
5,243,649 9/1993 Franson.
5,307,410 4/1994 Bennett .................................. 380/21
5,311,592 5/1994 Udd.
5,339,182 8/1994 Kimble et al..
5,418,905 5/1995 Rarity et al..
5,515,438 5/1996 Bennett et al..
5,675,648 10/1997 Townsend.

OTHER PUBLICATIONS

C.H. Bennett; Physical Rev. Let.; vol. 68, No. 21, 25 May 1992, pp. 3121–3124.

IBM Technical Disclosure Bulletin; vol. 26, No. 8, Jan. 1984, pp. 4363–4366.

IBM Technical Disclosure Bulletin, vol. 28, No. 7, Dec. 1985, pp. 3153–3163.

Primary Examiner—Gilberto Barrón, Jr.
Attorney, Agent, or Firm—Nixon & Vanderhye P.C.

[57] ABSTRACT

In a method of quantum cryptography, a transmitter (T) communicates on a quantum channel with several receivers (R1–R3). The receivers are located on different branches of a common communications network The method establishes a different respective secret key for each receiver. A timing pulse may be transmitted from the transmitter to the receivers to synchronise the receivers prior to a transmission on a quantum channel. The quantum channel may be multiplexed and transmitted concurrently with classical multi-photon transmissions on the network.

12 Claims, 8 Drawing Sheets

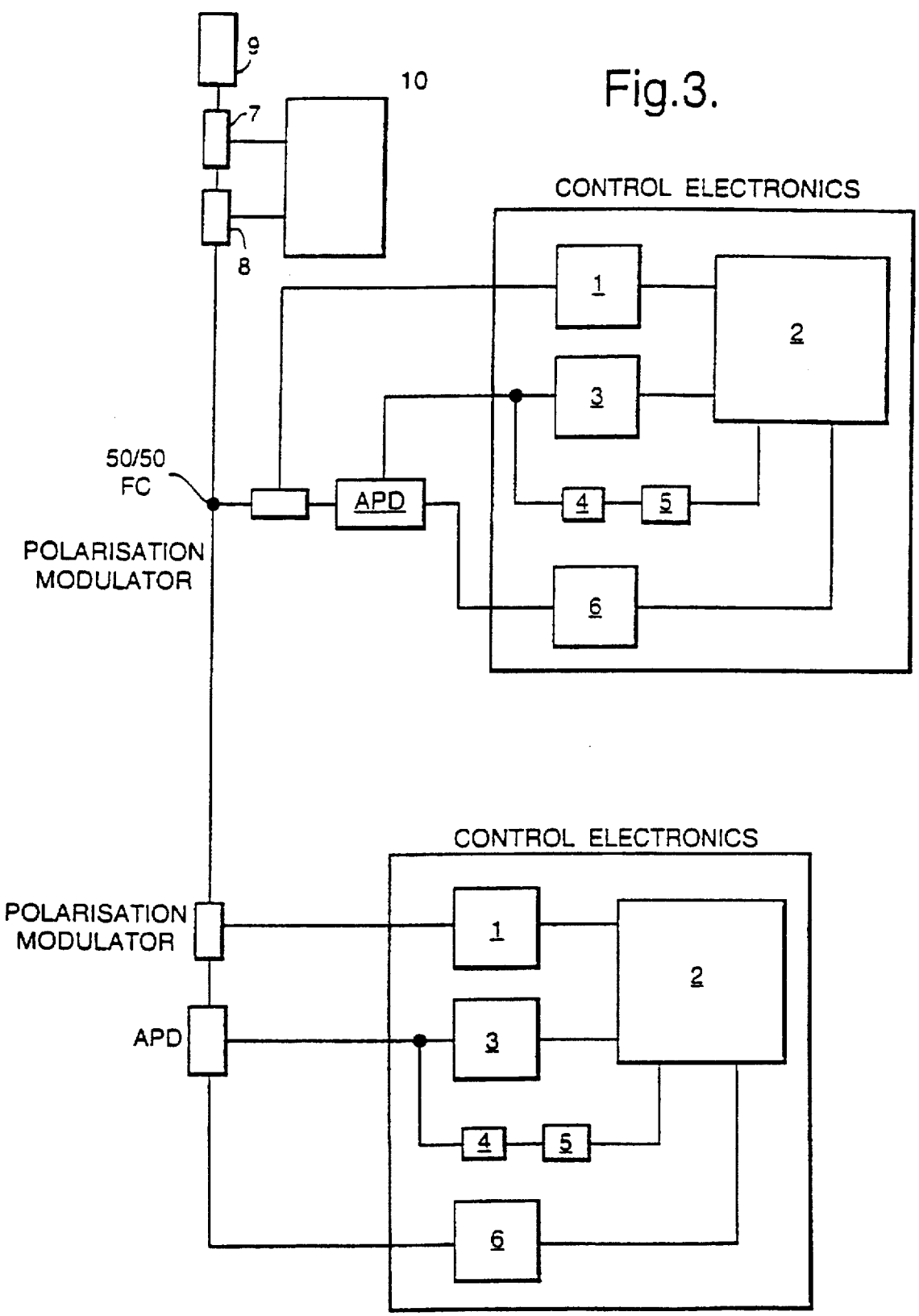

5,768,378

KEY DISTRIBUTION IN A MULTIPLE ACCESS NETWORK USING QUANTUM CRYPTOGRAPHY

RELATED APPLICATIONS

This application is related to the following copending commonly assigned applications:

| | |
|---|---|
| 08/464,710 | filed August 15, 1995 entitled "SYSTEM AND METHOD FOR KEY DISTRIBUTION USING QUANTUM CRYPTOGRAPHY" naming Townsend as inventor (now U.S. Pat. No. 5,675,648); |
| 08/612,881 | filed April 22, 1996 entitled "METHOD FOR KEY DISTRIBUTION USING QUANTUM CRYPTOGRAPHY" naming Messrs. Phoenix and Barnett as inventors; |
| 08/612,880 | filed March 8, 1996 entitled "SYSTEM AND METHOD FOR KEY DISTRIBUTION USING QUANTUM CRYPTOGRAPHY" naming Messrs. Townsend and Blow as inventors; |
| 08/617,848 | filed March 8, 1996 entitled "SYSTEM AND METHOD FOR QUANTUM CRYPTOGRAPHY" naming Mr. Blow as inventor; and |
| 08/776,296 | filed January 30, 1997 entitled "QUANTUM CRYPTOGRAPHY" naming Townsend as inventor. |

BACKGROUND TO THE INVENTION

The present invention relates to a system for the communication of encrypted data. In particular, it relates to the technique known as quantum cryptography.

In quantum cryptography, data is encoded at the transmitter and decoded at the receiver using some specified algorithm which is assumed to be freely available to all users of the system, whether authorised or otherwise. The security of the system depends upon the key to the algorithm being available only to the authorised users. To this end, the key is distributed over a secure quantum channel, that is a channel carried by single-photon signals and exhibiting non-classical behaviour, as further discussed below. The transmitter and the receiver then communicate over a separate channel, known as the public channel, to compare the transmitted and the received data. The presence of any eavesdropper intercepting the transmitted key results in a change in the statistics of the received data, which can be detected. Accordingly, in the absence of any such change in the statistics of the data, the key is known to be secure. The secret key thus established is used in the encryption and decryption of subsequent communications between the transmitter and receiver. For added security, the existing key may periodically be replaced by a newly generated key.

In general, a communication method using quantum cryptography includes the steps of:

(a) randomly selecting one of a plurality of encryption alphabets corresponding to different, non-commuting quantum mechanical operators and encoding a signal for transmission on the quantum channel using the selected operator;

(b) randomly selecting one of the different quantum mechanical operators and using that operator in detecting the signal transmitted in step (a);

(c) repeating steps (a) and (b) for each of a multiplicity of subsequent signals;

(d) communicating between the transmitter and the receiver independently of the encryption alphabets to determine for which of the transmitted signals common operators were selected by the transmitter and receiver, (e) comparing the signals transmitted and received in steps (a) and (b) to detect any discrepancy resulting from the presence of an eavesdropper; and, (f) in the event that in step (e) no eavesdropper is detected, using at least some of the data transmitted in steps (a) and (b) as a key for encryption/decryption of subsequent data transmissions between the two users of the channel. This scheme is described in detail in C. H. Bennett, G. Brassard, S. Breidbart and S. Wiesner, in "Advances in cryptology: Proceedings of Crypto'82, (Plenum, N.Y., 1983); C. H. Bennett and G. Brassard, IBM Technical Disclosure Bulletin, 28 3153, (1985).

In the term "encryption alphabet" as used herein, "encryption" refers to the coding of the single-photon pulses during the key distribution phase rather than to the subsequent encryption of text for transmission once a key has been established.

SUMMARY OF THE INVENTION

According to the present invention, a method of communication using quantum cryptography is characterised in that a transmitter communicates on a quantum channel over a common communications network with a plurality of receivers located on the common communications network and establishes a different respective secret key for each receiver.

Hitherto, quantum cryptography has only been used for communication between a single transmitter and receiver pair operating over a dedicated communication link. Typically the link has been provided by an optical fibre. The present invention by contrast uses quantum cryptography on a multiple access network. While the use of multiple access networks is of course well known for general communications purposes, such architectures are on the face of it unsuitable for quantum cryptography, since their functioning depends upon the classical behaviour of the signal at each branch or junction on the network. This behaviour breaks down in the case of the single-photon signals used for quantum cryptography. Such signals cannot be treated as being split at each branch, but instead must travel down one path or another, or be lost from the system, with a certain probability. The present inventor has realised however that the non-classical behaviour of a single-photon signal on such a network can be used to advantage to allow a different key to be established between the transmitter and each individual receiver. This makes possible subsequent secure bi-directional communication of encrypted data between the transmitter and each receiver using classical, i.e. multiphoton, signals. These encrypted transmissions are preferably made on the same common communications network used to carry the quantum channel. Alternatively, different communication systems might be used for the classical and quantum channels. In particular, the public discussion phase, that is steps (d) and (e) of the protocol, might for example use radio transmissions for communication between the transmitter and receiver. In the standard point-to-point application of quantum cryptography some of the secret bits that are generated are used to authenticate the messages passed over the public channel. This confirms that the legitimate users of the channel are in direct communication without the intervention of an eavesdropper [references mentioned above]. In this multi-user version of quantum cryptography, secret bits are generated at all terminals thus enabling authentication to be performed for all network users if required.

In the method adopted in the present invention, in steps (a) to (c) of the transmission protocol, each encoded bit transmitted is either lost from the system or received at one only of the plurality of receivers. The transmitter outputs a sufficient number of bits, each bit being carried by one single-photon signal, for each receiver to establish an r bit key, where r is a predetermined integer. The number of transmitted bits required is determined by the coupling ratios at each branch, the attenuation in the network, and the error rates in the raw key data, as described in further detail below. Each receiver receives a different sequence of bits, randomly determined by the paths taken by the individual single-photon pulses. Therefore, after the completion of the public discussion phase and testing to ensure there has been no eavesdropping, in accordance with steps (e) and (f) of the quantum cryptography protocol, the transmitter has established a distinct sequence of r secret bits with each terminal $R_i$ on the network. These secret bits can be used both for authentication and the generation of a respective shared key $K_i$, as described for the standard point-to-point application in C. H. Bennett, F. Bessette, G. Brassard, L. Salvail and J. Smolin: J. Crypt., 5, 3 (1992) and Bennett/Brassard IBM Tech. Discl. (already referenced on page 2 line 18). If required, the controller/transmitter can then use the individual $K_i$ as keys in one-time pad encryptions of a master network key or keys. The latter can then be securely distributed to all receivers/terminals, or subsets of terminals, on the network. Consequently, two types of encrypted communication are enabled. In one-to-one communications the controller and $R_i$ use $K_i$ to encrypt the multi-photon data signals that are broadcast in either direction on the network. Hence, although these signals are broadcast on the network and are therefore accessible to all receivers, only $R_i$ and the controller can decode these particular data transmissions. In this scenario secure inter-terminal communications can still take place between e.g. $R_i$ and $R_j$, however the controller must act as an interpreter using its knowledge of $K_i$ and $K_j$ to decode and encode the incoming and outgoing signals. Any-to-any communications can also take place among subsets of terminals sharing a master key, and in this case, if a transmission path goes via the controller, the controller only needs to perform routing or re-transmission of the incoming encoded data.

The current invention may be used in a range of multiple access network architectures such as, for example, tree, bus, ring or star configured Passive Optical Networks (PONS), or combinations thereof. There are a wide range of applications for such network architectures, including e.g. optically-distributed computer LANs, local-access telecommunications networks, and cable-television distribution networks. The invention can be used to increase the security of such systems in several different ways. For example, in the scenario of a local-access telecommunications network, the network may link several independent customers to a single transmitter or exchange. In this case the transmitter authenticates and establishes individual keys with some or all of the network users in order to enable secure one-to-one communications. This prevents potentially hostile or competitive users of the network from gaining access to each others data transmissions. Alternatively, the network may be used to link the dispersed sites of a single customer to a central exchange or controller. In this case, the controller can protect the integrity of the network as a whole by establishing individual keys with each remote terminal which may then be used to distribute a network master key or keys. Any-to-any secure communications are then enabled as described above. The latter scenario is also relevant to the case of a secure optically distributed computer LAN. The invention can be used to increase the security of such systems in several different ways. For example, the network may link several independent customers to a single transmitter or exchange. In this case, the transmitter sets up individual keys with some or all of the network users thereby preventing potentially hostile or competitive users of the network from gaining access to each others data transmissions. Alternatively, the network may be used to link the dispersed sites of a single customer to a central transmitter node. In this case the transmitter node plays the role of a central secure exchange. By establishing individually secure links with each remote terminal the transmitter can protect the integrity of the network as a whole as well as enabling secure communication between different terminals.

Preferably the key distribution process is initiated by the synchronisation of the system to a master clock in the transmitter. This process provides timing information which is subsequently used for decoding the quantum key data. Synchronisation may preferably be carried out using multi-photon timing pulses which are broadcast on the optical fibre network. The terminals then detect these pulses and thereby lock their local clocks to the central master clock. The central node then sends a time-referenced sequence of signals of suitable quantum states onto the network. These may take the form, for example, of single-photons obtained from a parametric amplifier source or, alternatively, weak pulses of light from an attenuated laser which in general contain no more than one and on average substantially less than one photon per pulse. Appropriate sources are discussed in the applicant's co-pending International applications PCT/GB 93/02637 (WO 94/15422) and PCT/GB 93/02075 (WO 94/08409), the subject matter of both applications being incorporated herein by reference. Both types of pulse exhibit the required quantum properties and the term "single-photon pulse" is used herein to denote all such pulses, irrespective of how they are produced. The pulses are encoded in different phase or polarisation states.

DESCRIPTION OF THE DRAWINGS

Embodiments of a system in accordance with the present invention will now be described in further detail by way of example only, with reference to the accompanying drawings, in which:

FIG. 3 is a detailed block diagram of a second embodiment of the invention;

DESCRIPTION OF EXAMPLES

A communication system embodying the present invention in a first example comprises a transmitter T and three receivers R1–R3. The transmitter T and receivers R1–R3 are linked by a passive optical network (PON) having a tree topology. At each junction in the network 50/50 couplers C1,C2 are provided.

In use, prior to the distribution of a key from the transmitter to the receivers, the system is synchronised to a clock in the transmitter. In order correctly to time the ensuing quantum transmissions, the different receivers must know when to begin making their single-photon measurements, i.e. they must know when the first time-slot defined by the transmitter is due to arrive. This will depend on the distance of the receiver from the transmitter. However, if initial synchronisation data is sent over the same network, the receivers can take account of the different time delays by initiating their quantum measurements at a fixed time τ after the final clock pulse arrives. This is matched by the transmitter, which initiates the quantum transmission also at time τ after the final clock pulse has been sent. This procedure is akin to the ranging techniques traditionally used in PONS to prevent time-slot collision on the return path from the terminals to the central node. In practice, therefore, elements of the timing system for the quantum key distribution channel may be combined with the ranging system used to control standard data transmission in the network.

In general, the paths from the central node to the various terminals in the network will have different channel transmission coefficients, and hence the received single-photon bit-rates will also differ from terminal to terminal. Since real single-photon counting detectors suffer from saturation at high count rates, there will be an upper limit on the allowable bit rate in the network. In addition, a lower limit on the bit rate is set by the requirement that the photo-count rate must be large compared with any background count rate due to noise mechanisms such as detector dark current. In order to avoid problems with detector saturation, it may be preferable to equalise all the detector count rates to that of the terminal with the lowest transmission coefficient. This can be achieved by means of optical attenuation or by controlling the sensitivity of the detectors, e.g., by varying the reverse bias voltage in an avalanche photodiode detector (APD). An appropriate APD is discussed below.

Figure 1:
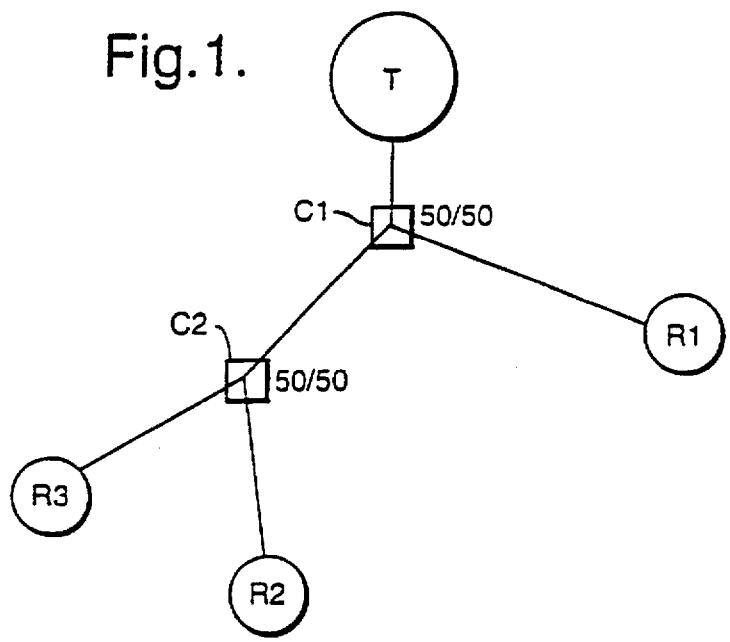
FIG. 1 is a diagram showing schematically a network embodying the invention.
Figure 6:
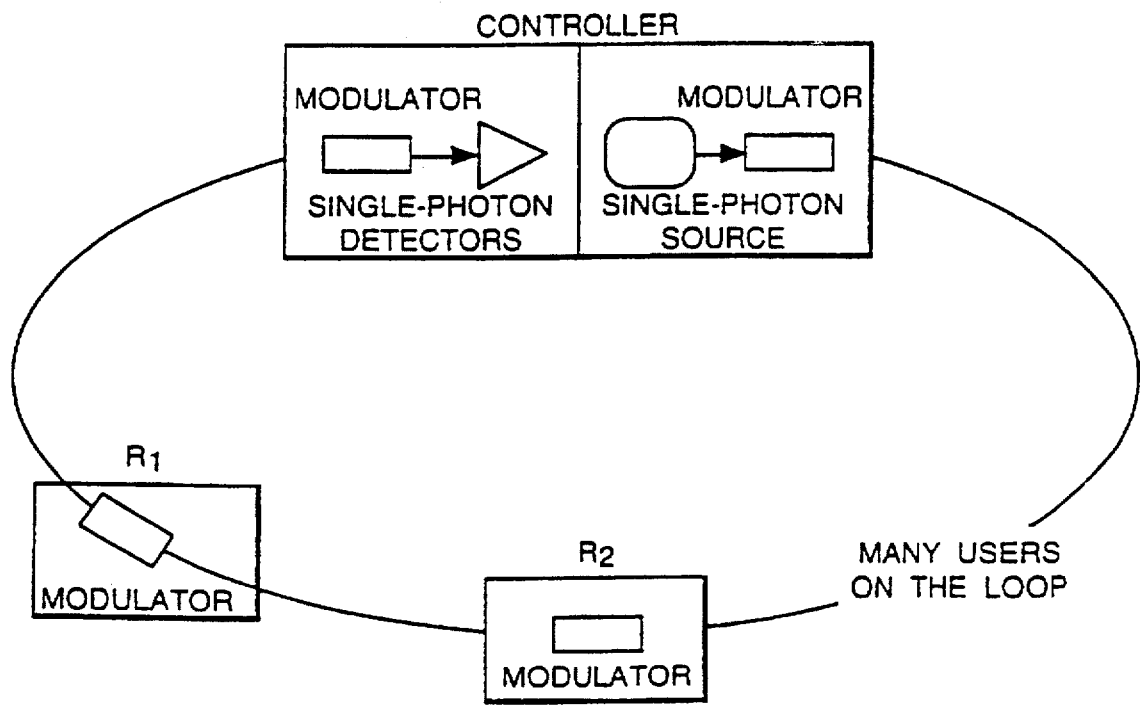
FIG. 6 is a schematic of a further alternative embodiment.

FIG. 1 illustrates a case where equalisation is not employed. Here, assuming that the fibre loss is negligible, the transmission coefficients are $t_1=0.5$ for the T-R1 path, and $t_2=t_3=0.25$ for the T-R2 and T-R3 paths respectively. This means that R1 will receive twice as many photons as either R2 or R3, and the count rates are chosen to lie within the detector performance limits discussed above. In order to establish three r-bit keys, the transmitter must send $(p)^{-1} \times (4r)$ photons, where p is a protocol- and error-dependent constant that represents the probability that a received raw key bit generates a final key bit. In the general case, the distribution of n r-bit keys requires $(p)^{-1} \times (r/t_j)$ photons, where $t_j$ is the smallest transmission coefficient in the network. In addition, system inefficiencies such as detector noise will lead to errors in the transmitted key data which must be identified and eliminated as outlined in C. H. Bennett, F. Bessette, G. Brassard and L. Salvail, J. Cryptology 5, 3 (1992). This process leads to a compression of the raw key data which must be taken into account if a final key of length r-bits is required. At the end of the public discussion stage of the protocol (d)–(f), which includes the authentication procedure, all terminals must be in possession of $m \geq r$ secret bits. They then agree with the transmitter to use e.g. the first r-bits of their individual sequences to form the individual keys.

Figure 2A:
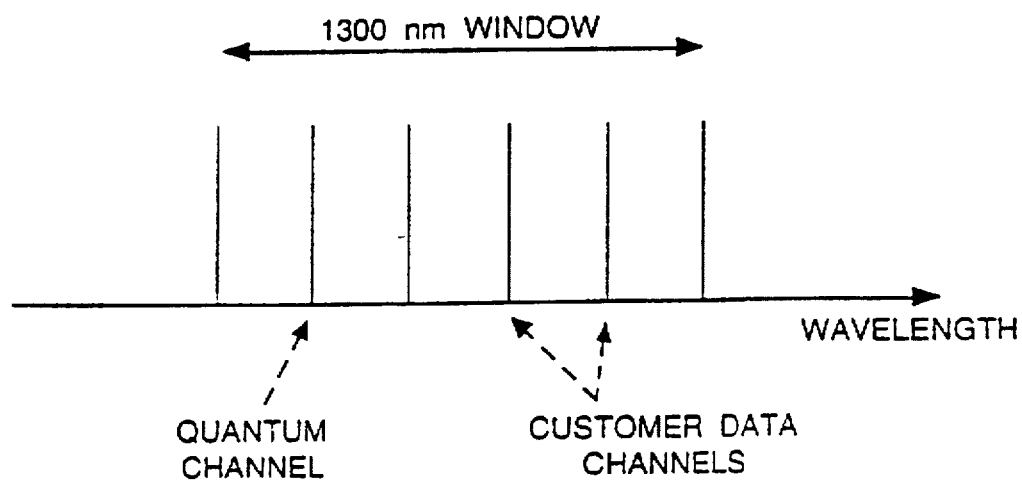
FIGS. 2a and 2b are diagrams showing the allocation of wavelengths to the quantum and classical channels of a system embodying the present invention.
Figure 2B:
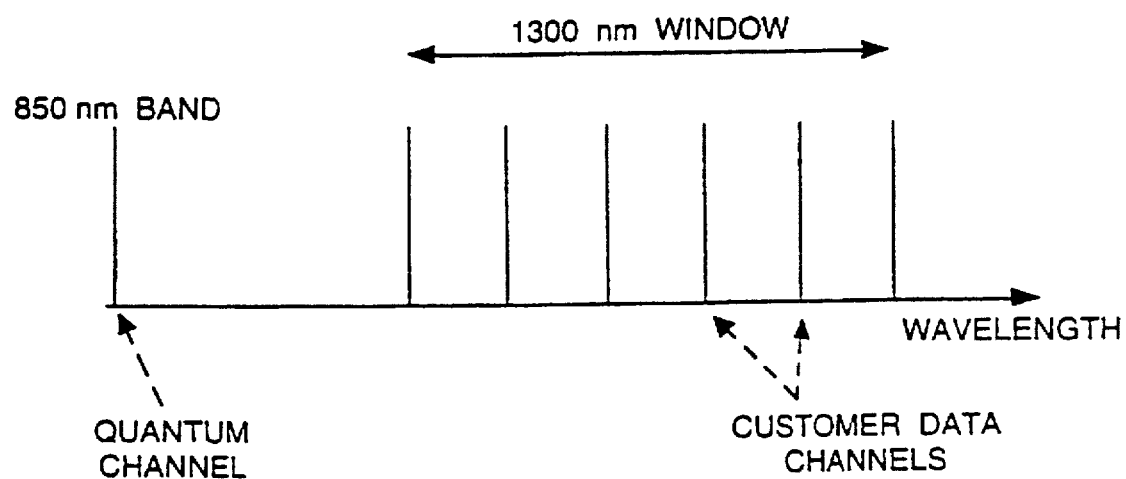

The quantum key distribution channel is arranged to operate independently of other transmission channels which use the network to carry either the encrypted data or standard (non-encrypted) signals. This is important since the quantum channel operates in a non-continuous burst transmission mode, whereas in general the data channels will be required to provide uninterrupted continuous transmission. The required separation of the quantum channel may be provided through use of a reserved wavelength, different from that used by the data channels. In this case the quantum channel could be isolated by means of wavelength-sensitive passive optical components such as WDM couplers (e.g. Scifam Fibre Optics P2SWM13/15B) and filters (e.g. JDS TB1300A). FIGS. 2a and 2b illustrate two possible variations of this scheme. In the first case, shown in FIG. 2a, the quantum channel lies within the 1300 nm telecommunication window along with several other channels reserved for conventional signal traffic. In the second situation, shown in FIG. 2b, the 850 nm window is reserved for the quantum channel. This has the advantage that single-photon detectors for this wavelength (Silicon APDs) are relatively insensitive to 1300 nm light and therefore isolation from the data channels is easier to achieve. This approach would require WDM couplers such as the JDS WD813 to combine and separate the quantum and conventional channels. Alternatively the 1500 nm band might be used for conventional signal traffic while the 1300 nm band is reserved for the quantum channel. Since, the sensitivity of germanium APDs is high at 1300 nm and falls rapidly for wavelengths longer than about 1400 nm, these detectors would be an attractive choice for this particular wavelength division scheme. The wavelength separation technique would also allow active components such as optical amplifiers (e.g. erbium or praseodymium rare-earth-doped fibre amplifiers) to be used at the data channel wavelengths, whilst operating the quantum channel at a wavelength outside the spontaneous emission spectrum of the amplifier. If this were not the case, the spontaneously generated photons from the amplifier would easily saturate the detectors on the quantum channel.

Alternatively, it is possible to operate the quantum and data channels at the same wavelength, and achieve isolation by means of polarisation- or time-division multiplexing. The former case uses phase-encoding for the quantum channel, as described, e.g., in our co-pending British application no. 9226995.0. The data channel operates on the orthogonal polarisation mode of the fibre, with isolation obtained by means of polarisation splitting couplers such as the JDS PB 100. In the time-division scheme, certain time slots are reserved for multi-photon data pulses which are detected by standard receivers linked to the network via standard fibre couplers. Saturation of the single-photon detectors during these time slots could be prevented either by means of switchable attenuators (intensity modulators) or by turning off the reverse bias to the devices. Any of these isolation techniques may also be employed to send the system timing information concurrently with the quantum key data. This approach may be useful if, for example, the timing jitter on the receiver local oscillators is too large to maintain system synchronisation over the timescale required for the quantum transmission. A further alternative technique provides the timing data concurrently with the quantum transmission using the same wavelength as the quantum channel. The receiver now contains, in addition, a standard detector such as a sensitive PIN-FET that is connected to the transmission fibre by a weak fibre tap that splits off e.g. ~10% of the incoming pulse intensity. The intensity of every n-th pulse is made sufficiently large, say $10^5$ photons, that the standard detector registers a pulse which can be used for timing purposes. If n is sufficiently large, e.g. 1000, the APDs will not suffer from heating effects or saturation, and a ×1000 frequency multiplier can be used in the receiver to generate a local oscillator at the clock frequency.

Although APD's are the preferred form of detector, the present invention is not limited to the use of APD's. Other detectors having appropriate sensitivity and discrimination at the single-photon level may be used. For example, the detector may use a photomultiplier tube.

FIG. 3 shows a specific example of a broadcast network containing two receivers and a transmitter. The transmitter consists of a gain-switched semiconductor laser 9, which may be a DFB or Fabry-Perot device, an attenuator or intensity modulator 7, and a polarisation modulator 8 and control electronics 10. The single-photon detectors in the receivers may be avalanche photodiodes (APDs) biased beyond breakdown and operating in the Geiger mode with passive quenching, as discussed in P. D. Townsend, J. G. Rarity and P. R. Tapster, Electronics Letters, 29, 634 (1993). Silicon APDs such as the SPCM-100-PQ (GE Canada Electro Optics) can be used in the 400–1060 nm wavelength range, while Germanium or InGaAs devices such as the NDL5102P or NDL5500P (NEC) can be used in 1000–1550 nm range. Each receiver includes a microprocessor control unit 2, which receives the output of the APD via a discriminator/amplifier circuit 3. The control unit 2 also controls an electronic filter 4 and local oscillator 5, as well as the APD bias supply 6. The electronic filter 4 isolates the first harmonic of the frequency spectrum of the signal output by the APD in response to synchronising pulses received via the network. This generates a sinusoidal signal at the pulse frequency which locks the local oscillator 5. The output of the local oscillator 5 is received at the control unit 2 to provide a timing reference during quantum transmissions.

The use of multi-photon signals on the transmission medium to calibrate the system prior to or during quantum transmission is described in further detail in our above-cited co-pending British patent application. This makes it possible to compensate, e.g., for changes in fibre polarisation resulting from environmental effects.

Figure 5A:
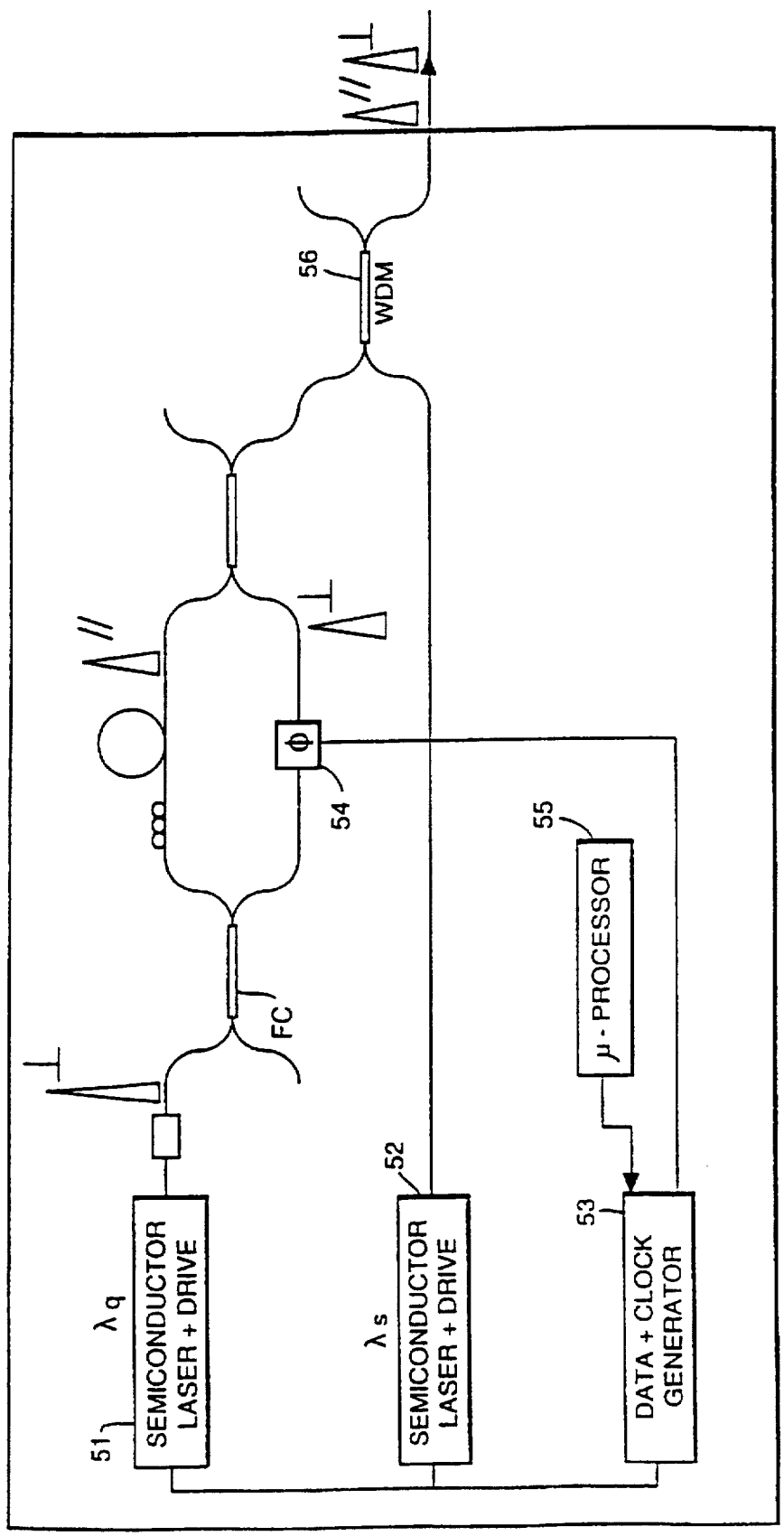
FIGS. 5a and 5b are a transmitter and receiver respectively for use in an alternative embodiment.
Figure 5B:
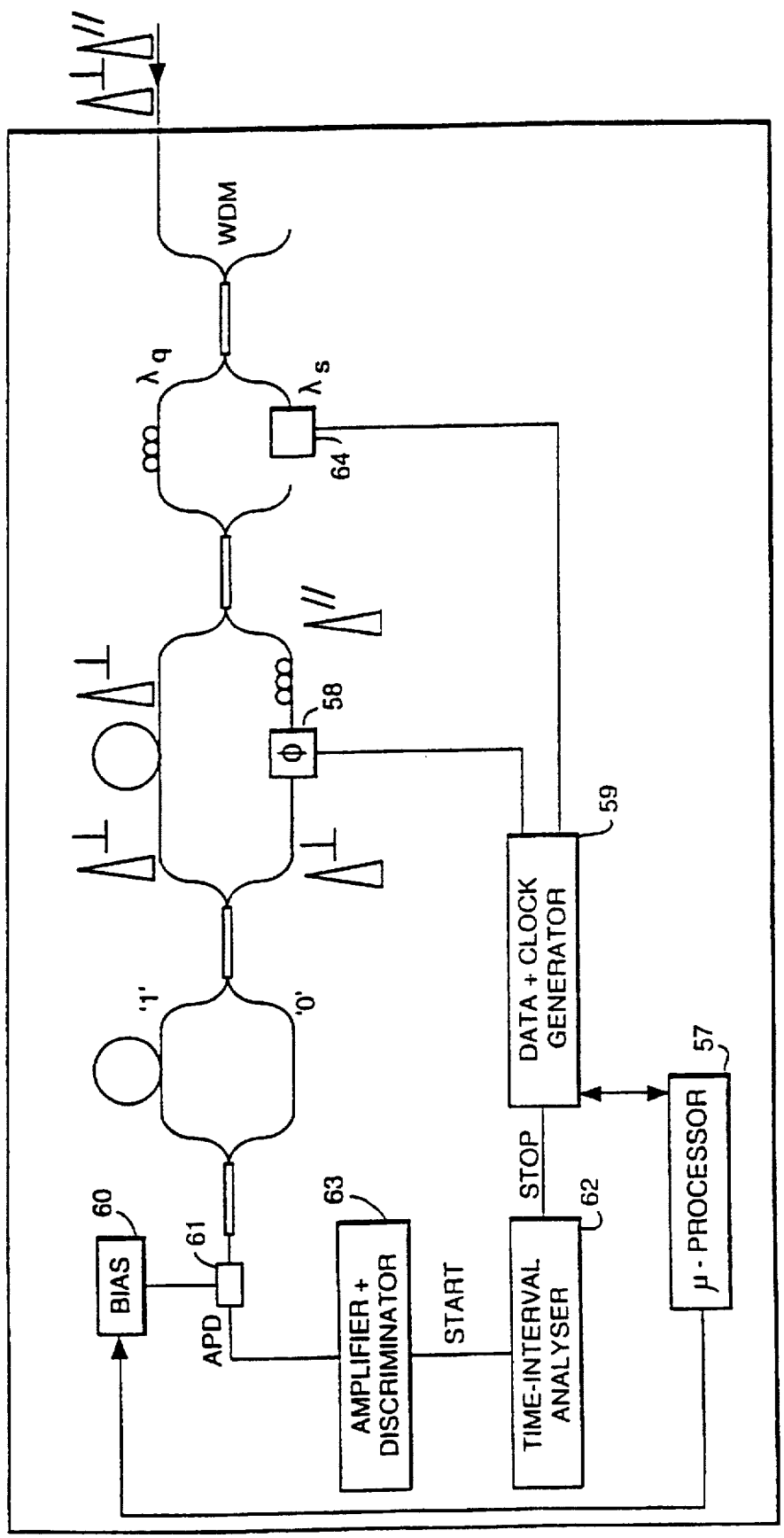

An alternative embodiment encodes and decodes different phase states rather than different polarisation states P. D. Townsend, J. G. rarity and P. R. Tapster, Elect. Lett., 29, 1291 (1993) and P. D. Townsend, Elect. Lett. 30, 809 (1994). In this embodiment, the transmitter of FIG. 5a is substituted for the transmitter shown in FIG. 3, and similarly each of the receivers is replaced by a receiver configured as shown in FIG. 5b. In the transmitter of this embodiment, a first pulsed semiconductor laser 51, operating at a first wavelength $\lambda_q$, where, e.g., $\lambda_q$=1300 nm provides the optical source for the quantum channel. The laser and a modulator driver 53 for a phase modulator 54 are controlled by a microprocessor 55.

The phase modulator 54 is located in one branch of the transmitter. A polarisation controller PC (e.g. BT&D/HP MCP1000) is located in the other branch of the transmitter.

A second semiconductor laser 52 provides a bright multi-photon source at a wavelength $\lambda_S$ where, e.g., $\lambda_S$=1560 nm. This signal is used for timing and calibration as described above. The signal at $\lambda_S$ is coupled to the output of the transmitter via a WDM coupler 56 which may be, e.g. a JDS WD1315 series device.

As an alternative to the use of separate sources for the quantum channel and the timing signal, a single semiconductor laser may be used feeding its output via a fused fibre coupler FC to two different branches, one including an attenuator, and the other branch being unattenuated. An optical switch may then be used to select either the bright or attenuated output. Depending upon the frequency requirement, either a slow electro-mechanical device such as the JDS Fitel SW12 or a fast electro-optic device such as the United Technologies Photonics YBBM could be used.

In the receiver of this embodiment, a respective control microprocessor 57 controls the receiver phase modulator 58 via a modulator driver 59. The receiver control processor also controls a detector bias supply 60 for the receiver single-photon detector 61. In both the transmitter and the receiver, where the signal path branches, fused-fibre 50/50 couplers are used. Suitable couplers are available commercially from SIFAM as model P22S13AA50. The timing signal at $\lambda_S$ is detected by a PIN-FET receiver 64.

Appropriate phase modulators 54, 58 for the data encoding and decoding are lithium niobate or semiconductor phase modulators operating at, e.g., 1–10 MHZ. An appropriate lithium niobate device is available commercially as IOC PM1300. An appropriate driver for the phase modulators is a Tektronix AWG2020, and this can also be used as a clock generator for the system. For the single-photon detectors, APDs as discussed above with reference to FIG. 3 may be used. Significant improvements could be obtained by combining the phase modulators and fibre devices shown in FIGS. 5a and 5b into single integrated structures. Variations on the current design or that discussed in P. D. Townsend, J. G. rarity and P. R. Tapster, Elect. Lett. 29, 634 (1993) could be integrated onto a lithium niobate chip with the fibre paths replaced by waveguides and the modulator region defined by electrodes as in a standard device. Alternative fabrication methods include e.g. photo-refractively-defined planar silica waveguide structures or semiconductor waveguide structures. In general, integration should lead to improved stability and compactness for the transmitter and receiver structures. In particular, this embodiment uses an NEC 5103 Ge APD cooled to 77K using, e.g., Hughes 7060H cryo-cooler or a liquid nitrogen dewar or cryostat. In the receiver in this embodiment, just a single APD is used with the signals corresponding to the different branches of the receiver being separated in time by virtue of a delay loop in the upper branch labelled "1". The key distribution protocol requires each received photon to be associated with a given clock period and also identified as a 0 or 1 depending upon which branch of the receiver it comes from. These functions are performed by a time interval analyser 62 (e.g. Hewlett-Packard 53110A). The start signals for this device are provided by the APD output after processing by a circuit 63 comprising an amplifier and discriminator which may be respectively, e.g. Lecroy 821 and Lecroy 621.

The timing signal referred to above may take the form of either a single trigger pulse, which is then used to initiate a burst of key data on the quantum channel, or as a continuous stream of pulses at the system clock frequency which are used to re-time the receiver clock between key transmissions. Before key transmission commences, the receiver varies the phase modulator DC bias level in order to zero the phase shift in the interferometer (i.e. photon transmission probability is maximised at one output port and minimised at the other). FIGS. 5a and 5b also show the relative spatial, temporal and polarisation changes experienced by the two components of a quantum channel pulse as they propagate through the transmitter and receiver. If all fibres in the system are polarisation-preserving then no active polarisation control or static polarisation controllers are required in the system. However if standard fibre is used for the transmission link then active polarisation control will be required at the input to the receiver. This can be performed using a standard detector, feed back circuit and automated polarisation control as described in our co-pending International application PCT/GB93/02637 (WO94/15422).

As described in our co-pending International application also filed this day (Agent's ref. 80/4570/03), the receivers, rather than destructively detecting signals on the quantum channel using respective single-photon detectors, may modulate single-photon signals received from a head-end or "controller" station before passing these back to the controller where they are detected in an appropriate single-photon detector. In this case the transmitter and receiver structures discussed above are both incorporated in the controller, and the network receiver stations R1, R2 . . . each contain a phase modulator, e.g. IOC PM1300. Each receiver uses a data generator, e.g. Tektronix AWG2020 to generate a waveform that produces a relative phase shift between the two orthogonally polarised pulses in each bit period. Alternatively, the system may be adapted to use polarisation modulators rather than phase modulators.

In use, in configurations where timing information is not transmitted concurrently with the quantum transmission, key distribution is initiated by the transmitter sending a stream of timing pulses into the network. The attenuator in the transmitter is not engaged at this point, so the pulses contain many photons and are received by both terminals. The receivers set the reverse bias on their detectors to be well-below breakdown so that the internal gain is low. In this mode the APDs can detect the multi-photon timing pulses without suffering from saturation. Each APD output signal will contain a frequency component at the fundamental repetition rate of the pulsed source, and this is used to lock the local oscillator in the receiver as described above.

After the synchronisation procedure the attenuator in the transmitter is engaged so that the output pulses contain on the order of 0.1 photons on average. In addition, the APDs in the receivers are biased beyond breakdown so that internal gain is high enough to achieve detection sensitivity at the single-photon level. Steps (a) to (c) of the quantum key distribution protocol are then carried out. In the currently described example, using polarisation encoding, the system uses a two-alphabet encoding scheme in which polarisation states are used to establish the sequences of key bits (i.e. 0°=0, 90°=1 and 45°=0, 1350°=1).

Figure 4A:
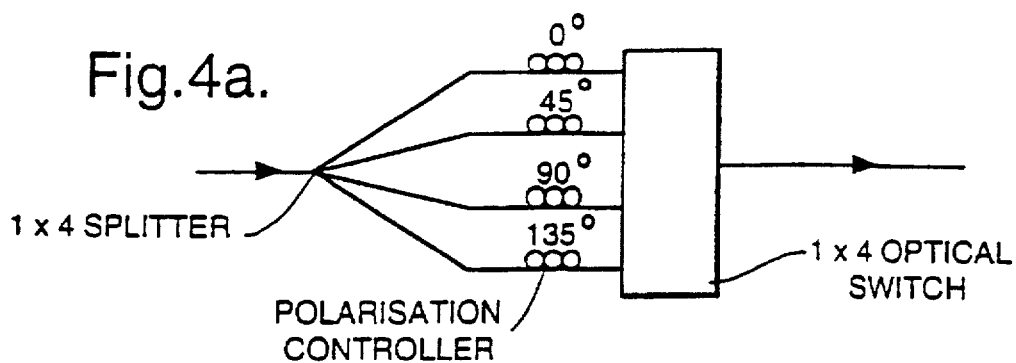
FIGS. 4a and 4b show details of polarisation modulators used in a transmitter and receiver respectively.
Figure 4B:
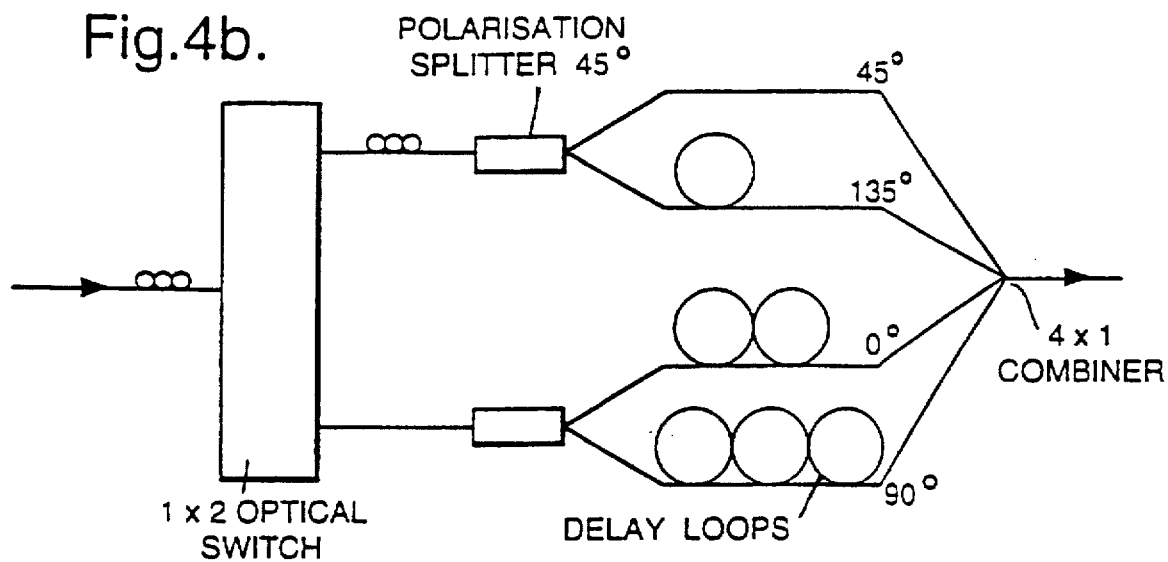

FIG. 4 shows details of polarisation modulators used in the polarisation-encoding embodiments encoding embodiments when high speed (e.g. $\geq 1$ MHZ) operation is required. The transmitter modulator is based on a 4-into-1 optical switch that is switched randomly so that for each pulse one of the four possible polarisation states is coupled into the network. The optical switch could be based on one or more electro-optic devices (e.g. United Technology lithium niobate Y-switch "YBBM") and the 4×1 coupler could be a fused fibre device (e.g. Sifam Fibre Optics P4S13C). The polarisation modulators in the receivers are similar in design. However, here the different polarisation channels contain fibre delays of differing lengths. This allows a single APD to be used at the output, with polarisation state identification performed by means of the time (within the laser period) at which the photo-count occurs. A similar detection scheme to this is described in A. Muller, J. Breguet and N. Gisin, Europhysics Letters, 23, 383 (1993).

Figure 8:
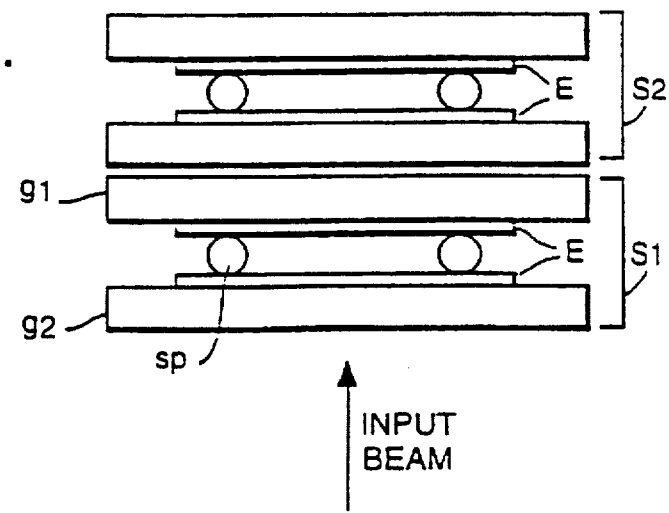
FIG. 8 is an alternative polarisation modulator.

FIG. 8 shows an alternative and preferred structure for a polarisation modulator for a polarisation modulator when low frequency operation (e.g. $\leq 1$ MHz) is acceptable. This comprises a stack of liquid crystal cells. In the illustrated example, the stack comprises two chiral smectic-C cells S1, S2. Each cell comprises a pair of glass substrates g1, g2 with an InTiO electrode E formed on each substrate. A polyamide coating, rubbed in one direction is formed on each of the electrodes. Spaces SP separate the substrates and define a volume in which the liquid crystal material is confined. A suitable material is that available from Merck as ZLI-431A. The spacing between the glass substrates in each cell is typically in the range 1.5 to 2 μm. The thickness of each cell is chosen so that at the wavelength of the input beam the cell functions e.g. as a half-wave or quarter-wave plate. When a field is applied across each cell using the electrodes, the liquid crystal molecules in the cell tilt at a characteristic tilt angle θ. Changing the polarity of the applied field flips the molecules through an angle of 2θ. The cell functions as a bistable device which is switched by the field between these two stable orientation states and can not in general have any intermediate orientations.

The properties outlined above enable a stack of switched cells such as that shown in the Figure to function as a polarisation modulator for selecting predetermined discreet polarisation states. For example, there has been described above a modulation scheme using four linear polarisation states of 0°, 90°, 45° and 135°. To implement this scheme, the first cell S1 is arranged to have a switching angle of θ=22.5° and the second cell S2 is arranged to have θ=11.25°. It is assumed that when both cells are in state "0" that their optical axis are parallel. Labelling the two states of the first cell as 0 and π/4, and the two states of the second cell as 0 and π/8, the different outputs required from the polarisation modulator are obtained as show in Table 1 below:

TABLE 1

| Input | cell 1 state | cell 2 state | Output |
|---|---|---|---|
| linear vertical | 0 | 0 | linear vertical |
| linear vertical | π/4 | 0 | linear horizontal |
| linear vertical | 0 | π/8 | linear 135° to horizontal (ccw) |
| linear vertical | π/4 | π/8 | linear 45° to horizontal (ccw) |

An alternative encoding scheme might use two linear polarisation states and two circular polarisation states linear vertical, linear horizontal, right circular and left circular. A liquid crystal modulator for implementing such a scheme again comprises a stack of two cells. In this case the first cell S1 is a half-wave cell with θ=22.5° and the second cell S2 is a quarter-wave cell with θ=22.5°. The following table shows the different states for this

TABLE 2

| Input | cell 1 state | cell 2 state | Output |
|---|---|---|---|
| linear vertical | 0 | 0 | linear vertical |
| linear vertical | 0 | π/4 | right circular |
| linear vertical | π/4 | π/4 | left circular |
| linear vertical | π/4 | 0 | linear horizontal |

A further alternative encoding scheme comprises six states being a superposition of the states used in the first two schemes. A modulator to implement this scheme uses a stack of three cells, the first two cells being as described in the immediately preceding example, and being followed by a third cell which is a half-wave cell with θ=11.25°. The states for this modulator are shown in the following table:

TABLE 3

| Input | cell 1 state | cell 2 state | cell 3 state | output |
|---|---|---|---|---|
| linear vertical | 0 | 0 | 0 | linear vertical |
| linear vertical | π/4 | 0 | 0 | linear horizontal |
| linear vertical | 0 | 0 | π/8 | linear 135° |
| linear vertical | π/4 | 0 | π/8 | linear 45° |
| linear vertical | 0 | π/4 | 0 | left circular |
| linear vertical | π/4 | π/4 | 0 | right circular |
| linear vertical | 0 | π/4 | π/8 | left circular |
| linear vertical | π/4 | π/4 | π/8 | right circular |

In this example, the left circular pair and right circular pair are essentially degenerate. While the absolute phase of the circular polarisations differ, the fact that the intensity is time averaged over a period many times the oscillation period of the wave means that the absolute phase is irrelevant. One is therefore left with four linear polarisation states and a left and right circular polarisation state. Effectively, when cell 2 is on, it does not matter what state cell 3 is in.

A number of other configurations are possible for a stacked liquid crystal modulator. For example the half-wave cells in the examples described above could be split into pairs of quarter-wave cells. The order of some of the cell combinations could also be changed. Further possible modification is the use of electroclinic devices to provide continuously tunable wave plates providing further coding flexibility.

The use of liquid crystal modulators as described above is found to be highly advantageous, enabling switching at relatively high rates with, for example, 10 μs pulse spacing and offering the possibility of compact, cheap devices.

Figure 7:
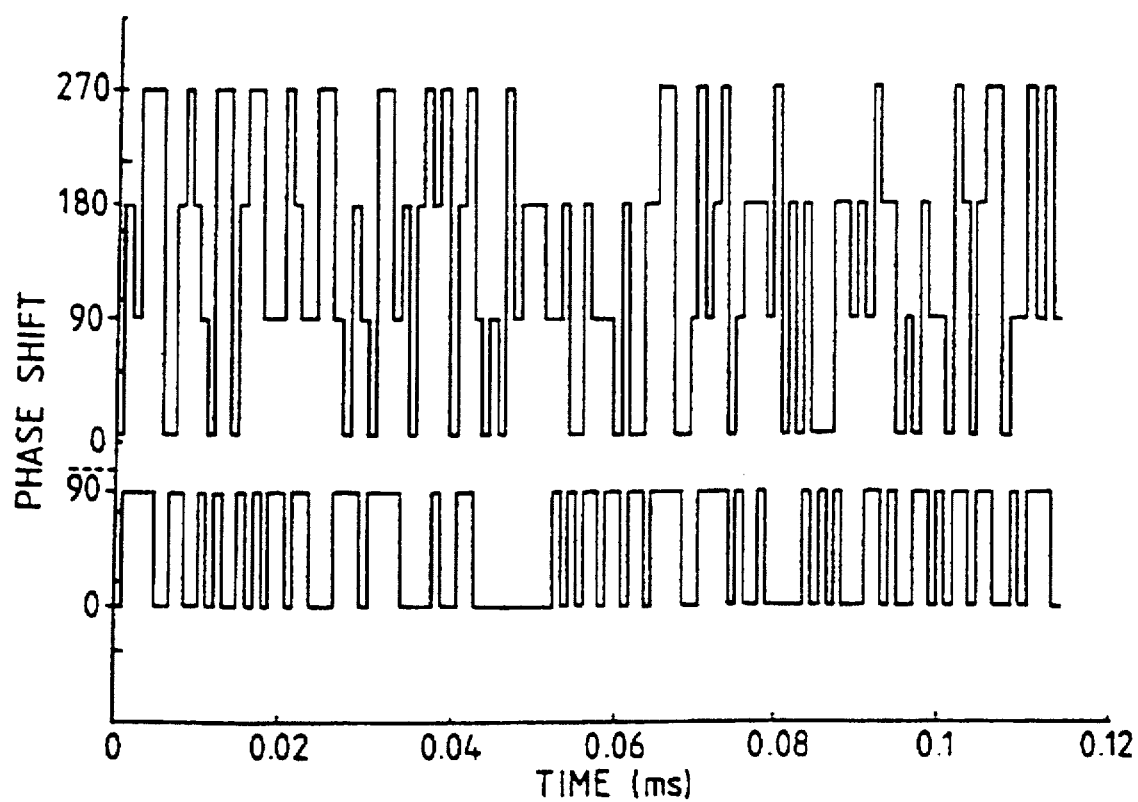
FIG. 7 is a graph showing phase modulator states for a transmitter (upper plot) and receiver (lower plot)

As already noted, phase modulation may be used as an alternative to polarisation modulation. FIG. 7 is a graph showing, in the upper plot, the encoding sequence of phase shifts of 0°, 90°, 180° or 270° applied at the transmitter and in the lower plot the two phase states of 0° or 90° used at the receiver in detecting the modulated signal. In this example, the bit period is 1 μs.

In the steps (a) to (c), a sufficient number of single photon pulses need to be transmitted for each receiver to establish the required number of key bits. The topology of optical fibre path from the central node to the terminals depends on the network architecture. For example, the path may split via a single 1-into-n coupler or some other combination of 1-into-m couplers, where n is the number of terminals on the network and m<n. The probability that any given photon arrives at a terminal from the central node is given by the transmission coefficient for that specific path, t=exp−(α1+β), where α is the fibre loss coefficient per unit length, 1 is the path length and β is the net coupling ratio for the path. The quantum mechanical properties of single photons ensure that a given photon will either be detected at one, and only one, of the terminals or will be lost from the system (α>0), and that this process occurs in a totally random and unpredictable way. Consequently, each terminal has no way of predicting whether or not a photon will arrive during a given clock period. Instead, all terminals make measurements as described in step (b) at the clock rate, and for each successful detection of a photon record the alphabet used for the measurement, the actual result of the measurement and the time-slot in which the photon arrived.

After completing the quantum transmission, the central node sequentially polls each of the terminals on the network and carries out steps (d) to (f) of the protocol. In this process the individual photons and their sent and received states are identified by means of the time-slot in which they were detected and transmitted. At the end of this process the central node is in possession of n secret keys, each one shared with a specific terminal on the network. However, except with a small probability which can be reduced arbitrarily close to zero by privacy amplification (see below) each terminal has no knowledge of any other key apart from its own. These keys can now be used to securely encrypt data transmissions between each terminal and the central node. Consequently, any encrypted data that is broadcast from the transmitter can only be read by the terminal for which it is intended. In addition, the terminals can communicate securely with each other via the central node which acts as a secure interpreter. The public discussion stages (steps (d) to (f)) described above may be carried out over the same network or over a separate and independent communication channel.

Practical quantum channels, suffer from unavoidable background error rates due to detector dark counts, and environmentally-induced fluctuations in the polarisation (or phase) state in the fibre etc. In this case the public discussion phase may contain an additional stage of error correction and so-called "privacy amplification". This both ensures that the transmitter and receiver end up with identical keys and that any key information leaked to an eavesdropper or another terminal is an arbitrarily small fraction of one bit. This procedure is outlined below and described in further detail in C. H. Bennett, F. Bessette, G. Brassard, L. Salvail and J. Smolin: "Experimental Quantum Cryptography", J. Cryptology, 5, 3 (1992).

Figure 9:
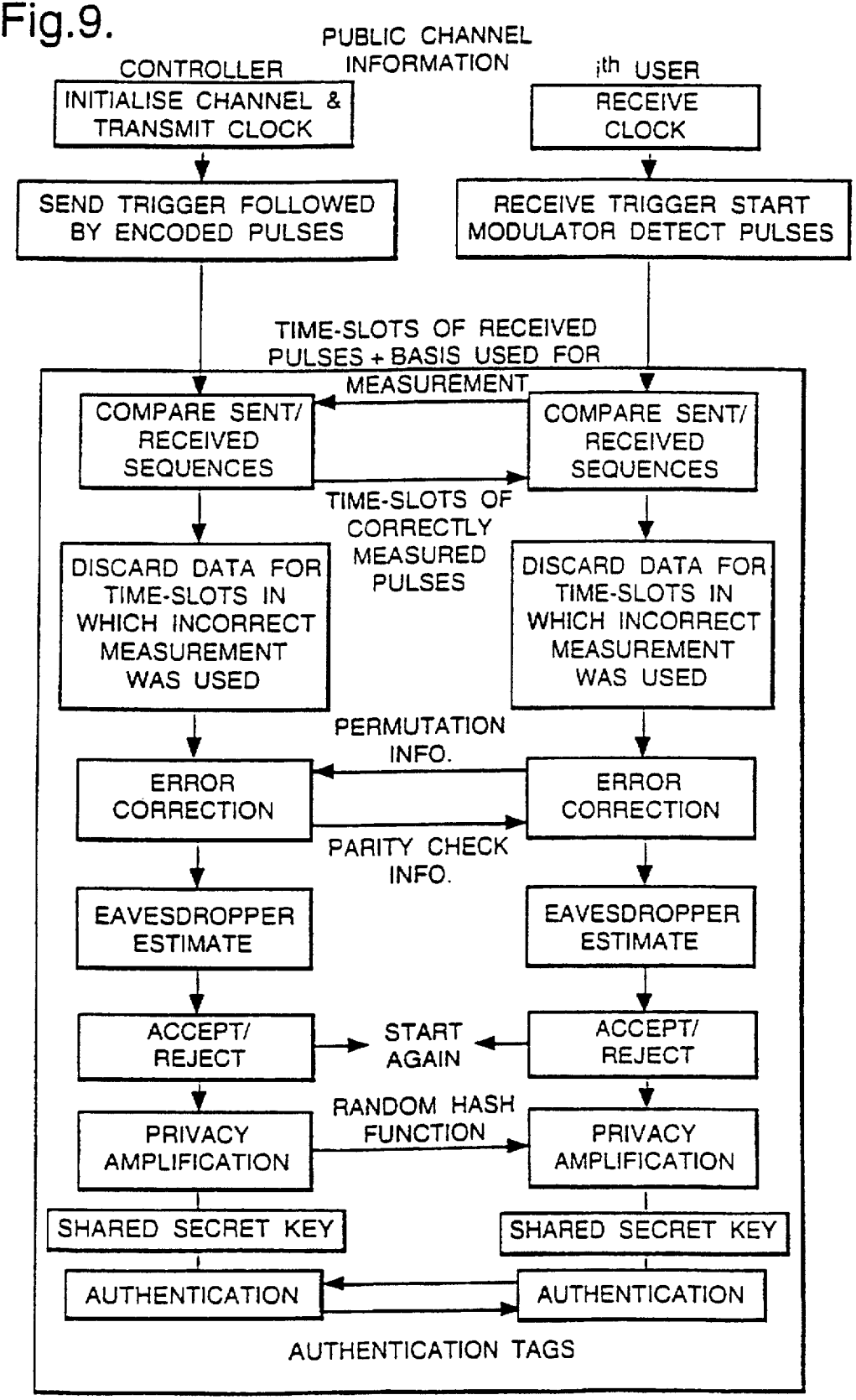
FIG. 9 is a flow diagram.

The purpose of quantum key distribution is for Alice and Bob (i.e. the transmitter and receiver) to share an identical secret string of bits. After discarding those bits occurring in time slots where different bases were chosen we would, in the absence of eavesdropping and in an ideal world, expect Alice and Bob to share an identical secret bit string. For security all errors should be assumed to have come from an eavesdropper. Given this assumption the question becomes one of whether a provably secret key can still be established despite the assumed presence of Eve. The procedure of error-correction, carried out over an authenticated public channel, will result in Eve knowing a greater fraction of the usable bits, as explained below. A procedure called "privacy amplification" can then be used to reduce Eve's information about the final key to a negligible amount at the expense of reducing the number of secret key bits. After this procedure Alice and Bob will possess a shared sequence of bits which is provably secret to an extremely high confidence level. The different stages of quantum key distribution are then as follows:

i) Alice and Bob perform raw transmission and discard bits from different bases.

ii) Public comparison of randomly-selected sample and estimation of error rate.

iii) Error correction procedure produces error-corrected key.

iv) Estimation of how much information Eve has about the key.

v) Perform privacy amplification to distil a final secret key about which Eve has negligible information. FIG. 9 is a flow diagram showing the above stages and the data flow between the controller (Alice) and the ith user (Bob).

Although the examples described above use optical fibre networks, the present invention is generally applicable to any system providing a medium which can be prepared and maintained in appropriate quantum states to provide a quantum channel. For example electron states or other particles may be used.

Although in the example of FIG. 1 only three receivers are shown, in practice networks employing greater numbers of receivers will often be used. The number chosen will vary according to the field of use. For a local installation on a single site, the network might comprise only 10 receivers or terminals. By contrast, for a public network several 10's or even a 100 or more receivers might be connected to the network and would receive quantum keys distributed from a single server.

In order to obtain an estimate of the maximum possible number of receivers allowed on the network, we consider the example of a ring network with a quantum channel operating in the 800 nm wavelength band which uses components discussed above. The network comprises n users and the splitting ratios of the couplers in the network are chosen so that each terminal receives a fraction $1/n$ of the photons in the quantum channel. The upper limit for the source pulse rate is determined by the response time of the detectors (~3 ns for the SPCM-100-PQ) and the bandwidth of the modulators (~600 MHz for the United Technology YBBM), in that the detection scheme must be able to distinguish individual, and possibly consecutive, pulses. Consequently, a pulse rate of 100 MHz is chosen for the laser which is attenuated to a low intensity corresponding to 0.1 photons per pulse on average after propagation through the transmitter modulator. The loss in the modulators is taken to be 10 dB, which is a worst case estimate. The average rate at which photons enter the network is thus $r_o$~10 MHz. If the network is sufficiently short (i.e. <1 km) that the loss in the transmission fibre is negligible, then each terminal receives photons at an average rate $r_o/n$. The quantum efficiency of the SPCM APD is about 30% and the loss in the modulator is 10 dB so the photon detection rate will be $0.03 r_o/n$. In order to achieve a low error rate in the system we choose $0.03 r_o/n > 1000$ (i.e. a factor of 10 higher than the dark count rate for the detector ~100 Hz). This gives a maximum value of n=300 for the number of receivers on the network. In practise it is likely than n would be reduced in order to accommodate more loss in the transmission fibre and hence an increased network span.

As discussed in the introduction above the present invention may be used with a variety of different network topologies, including those in which the receivers, rather than detecting the photon destructively, modulate it and pass it on to the transmitter, as described, e.g., in PCT/GB 93/02637. A possible attack upon such an implementation requires Eve (the eavesdropper) to intercept the quantum channel on both sides of a given user Bob. Then by transmitting and detecting a multi-photon signal Eve can determine unambiguously the state of Bob's modulator. Again in practice it is likely to be very difficult for Eve to establish connections to two or more points in the network. Nonetheless, where it desired to protect against an attack of the type described this may be done by providing at least one of the receivers on the network with a photon detector connected to the network by a relatively weak tap. This photon detector need not be of the sensitivity of the single photon detectors employed conventionally in receivers, nor need every user have such a detector. The presence of such a detector in the network facilitates the detection of any multi-photon probe used by Eve.

We claim:

1. A method of communication using quantum cryptography, said method comprising:

communicating from a transmitter on a quantum channel over a common communications network with a plurality of receivers located on the common communications network; and simultaneously establishing from a single series of transmitted modulated single photon signals different respective secret keys for a plurality of receivers.

2. A method as in claim 1, in which the network is an optical network.

3. A method as in claim 1 further comprising an initial step of broadcasting a multi-photon pulse from the transmitter to the plurality of receivers to synchronise the receivers to the transmitter.

4. A method as in claim 2, in which the step of broadcasting a multi-photon pulse forms part of a calibration phase in which the receivers are calibrated for subsequent reception of single-photon pulses.

5. A method of communication using quantum cryptography, said method comprising:

communicating from a transmitter on a quantum channel over a common communications network with a plurality of receivers located on the common communications network; and establishing a different respective secret key for each receiver;

the quantum channel being multiplexed with at least one classical channel carried concurrently on the network.

6. A method as in claim 5, in which the quantum channel is carried on a different wavelength to the at least one classical channel.

7. A method as in claim 5, in which a concurrently transmitted classical channel includes timing information for re-synchronising the receivers to the transmitter during reception of the transmission on the quantum channel.

8. A method as in claim 1 further comprising modifying the sensitivity of at least one of the receivers thereby substantially equalising the sensitivity of all the receivers on the network.

9. A method of communication using quantum cryptography, said method comprising:

communicating from a transmitter on a quantum channel over a common communications network with a plurality of receivers located on the common communications network; and establishing a different respective secret key for each receiver;

every nth pulse, where n is an integer greater than 1, being transmitted on the quantum channel with a higher intensity, the higher intensity pulses being discriminated at the receivers to provide a timing reference.

10. A communications system comprising:

a transmitter, a plurality of receivers, and a multiple access network linking the transmitter to the receivers, wherein the transmitter includes means for generating single-photon pulses encoded in different quantum states and means for establishing different quantum cryptographic keys over the multiple access network simultaneously for a plurality of receivers.

11. A communication system as in claim 10 in which each receiver includes a respective single-photon detector.

12. A communication system as in claim 10 in which at least one of the receivers includes a respective single-photon modulator and the transmitter includes a detector for single-photon signals modulated and returned by respective receivers.

* * * * *